United States Patent
Yoon et al.

(10) Patent No.: US 9,424,991 B2
(45) Date of Patent: Aug. 23, 2016

(54) DIELECTRIC CERAMIC COMPOSITION AND MULTILAYER CERAMIC CAPACITOR COMPRISING THE SAME

(71) Applicant: SAMSUNG ELECTRO-MECHANICS CO., LTD., Suwon-Si, Gyeonggi-Do (KR)

(72) Inventors: Seok Hyun Yoon, Suwon-Si (KR); Jae Sung Park, Suwon-Si (KR); Chang Hoon Kim, Suwon-Si (KR); Doo Young Kim, Suwon-Si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/675,272

(22) Filed: Mar. 31, 2015

(65) Prior Publication Data

US 2016/0086735 A1 Mar. 24, 2016

(30) Foreign Application Priority Data

Sep. 22, 2014 (KR) .................... 10-2014-0126160

(51) Int. Cl.
| | |
|---|---|
| *C04B 35/00* | (2006.01) |
| *H01G 4/30* | (2006.01) |
| *C04B 35/468* | (2006.01) |
| *H01G 4/12* | (2006.01) |
| *H01G 4/10* | (2006.01) |

(52) U.S. Cl.
CPC .............. *H01G 4/30* (2013.01); *C04B 35/4682* (2013.01); *H01G 4/10* (2013.01); *H01G 4/105* (2013.01); *H01G 4/1227* (2013.01); *H01G 4/1245* (2013.01); *C04B 2235/3217* (2013.01); *C04B 2235/3225* (2013.01); *C04B 2235/3239* (2013.01); *C04B 2235/3267* (2013.01); *C04B 2235/3418* (2013.01); *C04B 2235/401* (2013.01); *C04B 2235/404* (2013.01); *C04B 2235/442* (2013.01)

(58) Field of Classification Search
CPC .. C04B 35/462; C04B 35/465; C04B 35/468; C04B 35/4682; C04B 35/4686
USPC .................................. 501/136, 137, 138, 139
See application file for complete search history.

(56) References Cited

U.S. PATENT DOCUMENTS

| | | | |
|---|---|---|---|
| 7,297,403 B2 * | 11/2007 | Ito | C04B 35/628 428/402 |
| 7,652,870 B2 * | 1/2010 | Yamazaki | C04B 35/4682 361/311 |
| 2011/0222205 A1 | 9/2011 | Muraki et al. | |
| 2014/0135203 A1 * | 5/2014 | Choi | C04B 35/4682 501/137 |

FOREIGN PATENT DOCUMENTS

| | | |
|---|---|---|
| JP | 2004-345927 A | 12/2004 |
| JP | 2011-184279 A | 9/2011 |
| KR | 1999-0075846 A | 10/1999 |

* cited by examiner

*Primary Examiner* — Noah Wiese
(74) *Attorney, Agent, or Firm* — McDermott Will & Emery LLP (57) ABSTRACT

There are provided a dielectric ceramic composition comprising ceramic dielectrics and a multilayer ceramic capacitor including the same. The dielectrics have grains of a core-shell structure, and when a diameter of a core is defined as D1 and a diameter of the dielectric grain is defined as D2, 40 nm≤D1≤150 nm and 150 nm≤D2≤550 nm are satisfied.

18 Claims, 2 Drawing Sheets

DIELECTRIC CERAMIC COMPOSITION AND MULTILAYER CERAMIC CAPACITOR COMPRISING THE SAME

CROSS-REFERENCE TO RELATED APPLICATION

This application claims the priority and benefit of Korean Patent Application No. 10-2014-0126160 filed on Sep. 22, 2014, with the Korean Intellectual Property Office, the disclosure of which is incorporated herein by reference.

BACKGROUND

The present disclosure relates to a dielectric ceramic composition and a multilayer ceramic capacitor including the same.

As a ceramic electronic component, a multilayer ceramic capacitor includes a plurality of stacked dielectric layers, internal electrodes disposed to face each other with respective dielectric layers interposed therebetween, and external electrodes electrically connected to the internal electrodes.

Such a multilayer ceramic capacitor has been widely used as a component in mobile communications devices such as computers, personal data assistants (PDAs), mobile phones, and the like, due to advantages such as a small size, high capacitance, and ease of mounting.

In general, such a multilayer ceramic capacitor is manufactured by forming a layer of paste for an internal electrode on a layer of paste for a dielectric layer using a sheet formation method, a printing method, or the like, stacking the layers thereof, cutting the stacked layers into individual chips and sintering the chips.

According to the related art, as a dielectric material used in a multilayer ceramic capacitor, or the like, a barium titanate ($BaTiO_3$) based dielectric material has been used.

Meanwhile, in accordance with the development of high capacitance multilayer ceramic capacitors, short circuit defects in addition to reduced levels of reliability and high-temperature breakdown voltage characteristics are emerging as significant problems.

RELATED ART DOCUMENT (Patent Document 1) Korean Patent Laid-Open Publication No. 1999-0075846

SUMMARY

An aspect of the present disclosure may provide a dielectric ceramic composition and a multilayer ceramic capacitor including the same.

According to an aspect of the present disclosure, a dielectric ceramic composition may contain base powder and an accessory ingredient, wherein the base powder contains dielectric grains having a core-shell structure, and when a diameter of a core is defined as D1 and a diameter of the dielectric grain is defined as D2, 40 nm≤D1≤150 nm and 150 nm≤D2≤550 nm are satisfied.

According to another aspect of the present disclosure, a multilayer ceramic capacitor may include: a ceramic body in which dielectric layers and first and second internal electrodes are alternately stacked; and first and second external electrodes formed on both end portions of the ceramic body and electrically connected to the first and second internal electrodes, wherein the dielectric layer contains a dielectric ceramic composition containing base powder and an accessory ingredient, the base powder including dielectric grains having a core-shell structure, and when a diameter of a core is defined as D1 and a diameter of the dielectric grain is defined as D2, 40 nm≤D1≤150 nm and 150 nm≤D2≤550 nm are satisfied.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure relates to a dielectric ceramic composition. Examples of an electronic component containing the dielectric ceramic composition include a capacitor, an inductor, a piezoelectric element, a varistor, a thermistor, or the like. Hereinafter, the dielectric ceramic composition and a multilayer ceramic capacitor as an example of the electronic component will be described.

The dielectric ceramic composition according to an exemplary embodiment of the present disclosure may contain base powder and an accessory ingredient, wherein the base powder contains dielectric grains having a core-shell structure, and when a diameter of a core is defined as D1 and a diameter of the dielectric grain is defined as D2, D1 and D2 satisfy the following Expressions: 40 nm≤D1≤150 nm and 150 nm≤D2≤550 nm, respectively.

The dielectric ceramic composition according to an exemplary embodiment of the present disclosure may satisfy the X5R (−55° C.~85° C.) and X7R (−55° C.~125° C.) characteristics of Electronic Industries Association (EIA) standard.

In addition, the present disclosure may provide a multilayer ceramic capacitor using the dielectric ceramic composition, such that the temperature characteristics may be satisfied, and excellent reliability may be obtained.

Figure 1:
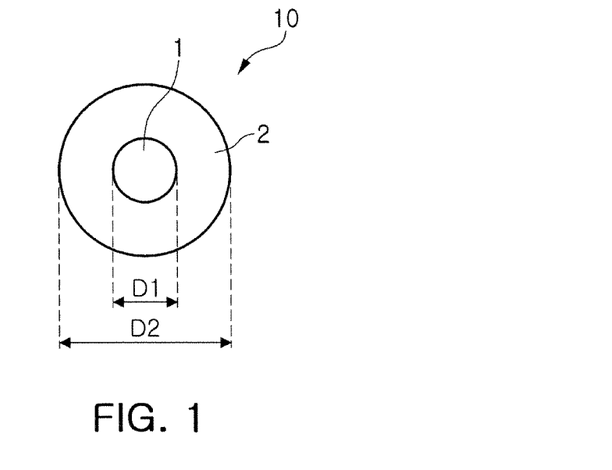
FIG. 1 is a view schematically showing a base powder including dielectric grains having a core-shell structure in a dielectric ceramic composition according to an exemplary embodiment of the present disclosure.

FIG. 1 is a view schematically showing the base powder including dielectric grains having the core-shell structure contained in the dielectric ceramic composition according to an exemplary embodiment of the present disclosure.

Referring to FIG. 1, the dielectric ceramic composition according to an exemplary embodiment of the present disclosure may contain the base powder and the accessory ingredient, wherein the base powder contains the dielectric grains 10 having the core-shell structure.

That is, the base powder may contain the dielectric grain 10 having the core shell structure composed of a core 1 in which an additive corresponding to the accessory ingredient is not solid-solubilized and a shell 2 which encloses the core 1 and in which the additive corresponding to the accessory ingredient is solid-solubilized.

Figure 2:
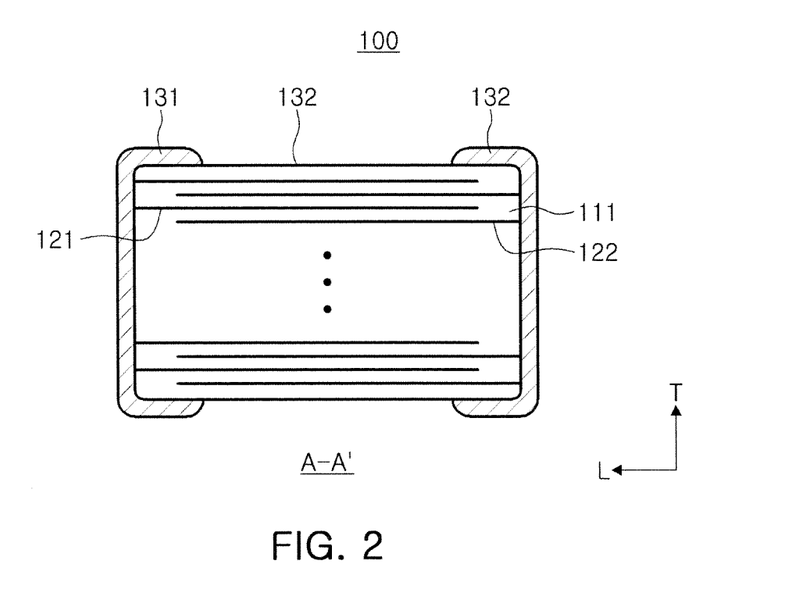
FIG. 2 is a graph showing ranges of D1 and D2 for realizing high permittivity and excellent high-temperature breakdown voltage characteristics when a diameter of a core is defined as D1 and a diameter of a dielectric grain is defined as D2 in the base powder contained in the dielectric ceramic composition according to an exemplary embodiment of the present disclosure.

FIG. 2 is a graph showing ranges of D1 and D2 for realizing high permittivity and excellent high-temperature breakdown voltage characteristics when the diameter of the core is defined as D1 and the diameter of the dielectric grain is defined as D2 in the base powder contained in the dielectric ceramic composition according to an exemplary embodiment of the present disclosure.

Referring to FIGS. 1 and 2, in the dielectric ceramic composition according to an exemplary embodiment of the present disclosure, when the diameter of the core is defined as D1 and the diameter of the dielectric grain is defined as D2, D1 and D2 may satisfy the following Expressions: 40 nm≤D1≤150 nm and 150 nm≤D2≤550 nm, respectively.

In general, as the development of a high capacitance multilayer ceramic capacity has conducted, a thickness of a dielectric layer has been gradually thinned, and accordingly, a short defect problem as well as problems in reliability and high-temperature breakdown voltage characteristics has occurred.

These problems may be solved by applying fine barium titanate powder, but there was a problem in that high capacitance may not be obtained due to the fine barium titanate powder.

However, according to an exemplary embodiment of the present disclosure, high permittivity and excellent high-temperature breakdown voltage characteristics may be realized by adjusting the diameter D1 of the core 1 and the diameter D2 of the dielectric grain 10 to satisfy the following Expressions: 40 nm≤D1≤150 nm and 150 nm≤D2≤550 nm.

Therefore, in the case of the multilayer ceramic capacitor using the dielectric ceramic composition according to an exemplary embodiment of the present disclosure, high permittivity and excellent high-temperature breakdown voltage characteristics may be realized, and the short defect may be decreased.

In the case in which the diameter D1 of the core 1 is less than 40 nm, temperature coefficient of capacitance (TCC) characteristics may be deteriorated, such that the X5R (−55° C.~85° C.) characteristics may not be satisfied, and in the case in which the diameter D1 is more than 150 nm, the short defect may be increased.

Meanwhile, in the case in which the diameter D2 of the dielectric grain 10 is less than 150 nm, permittivity may be decreased, such that it may be difficult to obtain desired capacitance, and in the case in which the diameter D2 is more than 550 nm, the temperature coefficient of capacitance (TCC) characteristics may be deteriorated, and a short generation rate may be increased.

Further, permittivity of the dielectric ceramic composition may be increased by adjusting a Ba/Si ratio for proper permittivity and sintering properties.

Hereinafter, each ingredient of the dielectric ceramic composition according to an exemplary embodiment of the present disclosure will be described in detail.

a) Base Powder

The dielectric ceramic component according to an exemplary embodiment of the present disclosure may contain the base powder represented by $BaTiO_3$.

According to an exemplary embodiment of the present disclosure, the base powder may be represented by $BaTiO_3$, but is not limited thereto. For example, the base powder may be presented by $(Ba_{1-x}Ca_x)(Ti_{1-y}Ca_y)O_3$, $(Ba_{1-x}Ca_x)(Ti_{1-y}Zr_y)O_3$, $Ba(Ti_{1-y}Zr_y)O_3$, or the like, formed by partially solid-solubilizing Ca, Zr, or the like, therein.

That is, the base powder may contain at least one selected from the group consisting of $BaTiO_3$, $(Ba_{1-x}Ca_x)(Ti_{1-y}Ca_y)O_3$ (0≤x≤0.3, 0≤y≤0.1), $(Ba_{1-x}Ca_x)(Ti_{1-y}Zr_y)O_3$ (0≤x0.3, 0≤y≤0.5), and $Ba(Ti_{1-y}Zr_y)O_3$ (0<y≤0.5), but is not limited thereto.

As described below, a dielectric ceramic composition having high permittivity and excellent high-temperature breakdown voltage characteristics may be provided by adjusting contents of barium (Ba), which is a fourth accessory ingredient, and silicon (Si), which is a sixth accessory ingredient, with respect to the base material main ingredient.

The dielectric ceramic composition according to an exemplary embodiment of the present disclosure may have a room-temperature permittivity of 2000 or more.

Although not particularly limited, the base powder may have an average particle size of 40 nm or more but 150 nm or less.

b) First Accessory Ingredient

According to an exemplary embodiment of the present disclosure, the dielectric ceramic composition may contain an oxide or carbonate containing at least one of Mn, V, Cr, Fe, Ni, Co, Cu, and Zn as a first accessory ingredient.

The oxide or carbonate containing at least one of Mn, V, Cr, Fe, Ni, Co, Cu, and Zn as the first accessory ingredient may be contained at a content of 0.1 to 2.0 mol % on the basis of 100 mol % of the base powder.

The first accessory ingredient may serve to decrease a sintering temperature of a multilayer ceramic capacitor using the dielectric ceramic composition and improve the high-temperature breakdown voltage characteristics.

The content of the first accessory ingredient and contents of second to sixth accessory ingredients to be described below, which are on the basis of 100 mol % of the base powder, may be particularly defined as mol % of metal ions contained in each of the accessory ingredients.

In the case in which the content of the first accessory ingredient is less than 0.1 mol %, the sintering temperature may be increased, and the high-temperature breakdown voltage characteristics may be slightly deteriorated.

In the case in which the content of the first accessory ingredient is more than 2.0 mol %, the high-temperature breakdown voltage characteristics and room-temperature resistivity may be deteriorated.

Particularly, the dielectric ceramic composition according to an exemplary embodiment of the present disclosure may contain the first accessory ingredient having a content of 0.1 to 2.0 mol % on the basis of 100 mol % of base powder, and accordingly, the dielectric ceramic composition may be sintered at a low temperature and obtain high high-temperature breakdown voltage characteristics.

c) Second Accessory Ingredient

According to an exemplary embodiment of the present disclosure, the dielectric ceramic composition may contain a second ingredient, which is an oxide or carbonate containing a fixed-valence acceptor element (Mg).

The dielectric ceramic composition may contain the second ingredient, which is the oxide or carbonate containing the fixed-valence acceptor element (Mg), at a content of 0.0 to 0.5 mol % on the basis of 100 mol % of the base powder.

The second accessory ingredients, which are the fixed-valence acceptor element and compounds containing the same, may adjust a micro structure (suppress abnormal grain growth) in the dielectric ceramic composition and impart reduction resistance.

In the case in which the content of the second accessory ingredient is more than 0.5 mol % on the basis of 100 mol % of the base powder, permittivity may be decreased, which is not preferable.

d) Third Accessory Ingredient

According to an exemplary embodiment of the present disclosure, the dielectric ceramic composition may contain a third accessory ingredient, which is an oxide or carbonate containing at least one of Y, Dy, Ho, Er, Gd, Ce, Nd, Pm, Eu, Tb, Tm, Yb, Lu, and Sm.

The dielectric ceramic composition may contain the third accessory ingredient, which is the oxide or carbonate containing at least one of Y, Dy, Ho, Er, Gd, Ce, Nd, Pm, Eu, Tb, Tm, Yb, Lu, and Sm, at a content of 0.0 to 4.0 mol % on the basis of 100 mol % of the base powder.

According to an exemplary embodiment of the present disclosure, the third accessory ingredient may serve to prevent deterioration of reliability of the multilayer ceramic capacitor using the dielectric ceramic composition.

In the case in which the content of the third accessory ingredient is more than 4.0 mol %, reliability may be deteriorated, or permittivity of the dielectric ceramic composition may be decreased and the high-temperature breakdown voltage characteristics may be deteriorated.

e) Fourth Accessory Ingredient

According to an exemplary embodiment of the present disclosure, the dielectric ceramic composition may contain a fourth accessory ingredient, which is an oxide or carbonate containing Ba.

The dielectric ceramic composition may contain the fourth accessory ingredient, which is an oxide or carbonate containing Ba, at a content of 0.0 to 4.15 mol % on the basis of 100 mol % of the base powder.

The content of the fourth accessory ingredient may be on the basis of a content of a Ba element contained in the fourth accessory ingredient without distinguishing an addition form such as an oxide or carbonate form.

The fourth accessory ingredient may play roles such as sintering promotion, permittivity adjustment, and the like, in the dielectric ceramic composition, and in the case in which the content thereof is more than 4.15 mol % on the basis of 100 mol % of the base powder, permittivity may be decreased, or the sintering temperature may be increased.

f) Fifth Accessory Ingredient

According to an exemplary embodiment of the present disclosure, the dielectric ceramic composition may contain a fifth accessory ingredient containing at least one selected from the group consisting of oxides and carbonates of at least one element of Ca and Zr.

The dielectric ceramic composition may contain the fifth accessory ingredient, which is an oxide or carbonate containing at least one of Ca or Zr, at a content of 0.0 to 20.0 mol % on the basis of 100 mol % of the base powder.

The content of the fifth accessory ingredient may be on the basis of a content of at least one element of Ca and Zr contained in the fifth accessory ingredient without distinguishing an addition form such as an oxide or carbonate form.

The fifth accessory ingredient may serve to form a core-shell structure in the dielectric ceramic composition to improve permittivity and reliability. In the case in which the fifth accessory ingredient is contained at a content of 20.0 mol % or less on the basis of 100 mol % of the base powder, a dielectric ceramic composition for realizing high permittivity and excellent high-temperature breakdown voltage characteristics may be provided.

In the case in which the content of the fifth accessory ingredient is more than 20.0 mol % on the basis of 100 mol % of the base powder, room-temperature permittivity may be decreased, and the high-temperature breakdown voltage characteristics may also be deteriorated.

g) Sixth Accessory Ingredient

According to an exemplary embodiment of the present disclosure, the dielectric ceramic composition may contain an oxide containing at least one of Si and Al or a glass compound containing Si as a sixth accessory ingredient.

The dielectric ceramic composition may contain the sixth accessory ingredient, which is the oxide containing at least one of Si and Al or the glass compound containing Si, at a content of 0.0 to 4.0 mol % on the basis of 100 mol % of the base powder.

The content of the sixth accessory ingredient may be on the basis of a content of at least one element of Si and Al contained in the sixth accessory ingredient without distinguishing an addition form such as a glass, oxide, or carbonate form.

The sixth accessory ingredient may serve to decrease a sintering temperature of a multilayer ceramic capacitor using the dielectric ceramic composition and improve the high-temperature breakdown voltage characteristics.

In the case in which the content of the sixth accessory ingredient is more than 4.0 mol % on the basis of 100 mol % of the base powder, there are problems such as deterioration of the sintering property and density, a secondary phase formation, and the like, which is not preferable.

Figure 3:
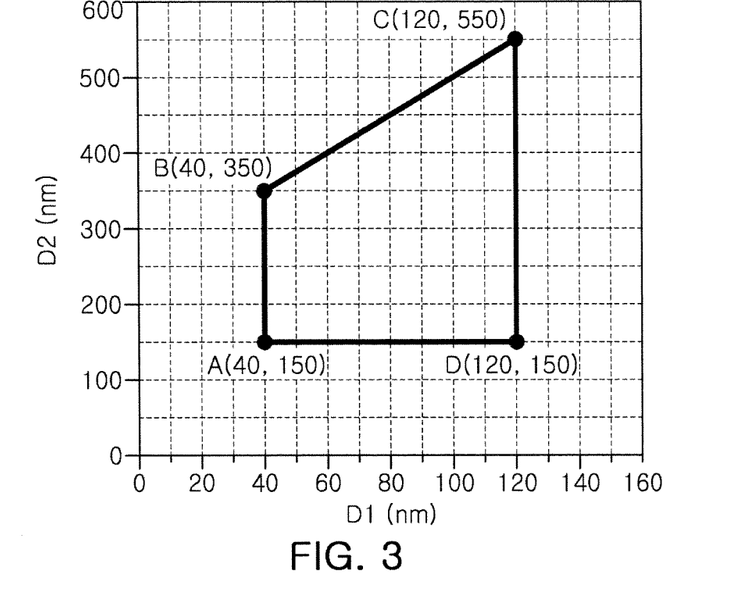
FIG. 3 is a schematic perspective view of a multilayer ceramic capacitor according to another exemplary embodiment of the present disclosure.
Figure 4:
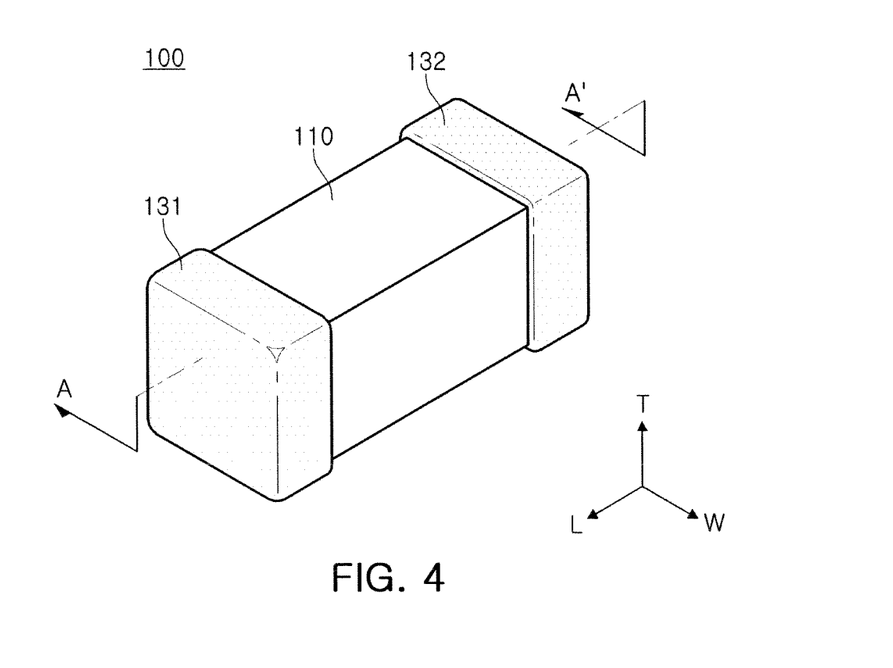
FIG. 4 is a schematic cross-sectional view of the multilayer ceramic capacitor taken along line A-A' of FIG. 3.

FIG. 3 is a schematic perspective view of a multilayer ceramic capacitor 100 according to another exemplary embodiment of the present disclosure, and FIG. 4 is a schematic cross-sectional view of the multilayer ceramic capacitor 100, taken along line A-A' of FIG. 3.

Referring to FIGS. 3 and 4, the multilayer ceramic capacitor 100 according to another exemplary embodiment of the present disclosure may include a ceramic body 110 in which dielectric layers 111 and first and second internal electrodes 121 and 122 are alternately stacked. First and second external electrodes 131 and 132 electrically connected to the first and second internal electrodes alternately disposed in the ceramic body 110, respectively, may be formed on both ends of the ceramic body 110.

A shape of the ceramic body 110 is not particularly limited, but generally, may be a hexahedral shape. In addition, a dimension of the ceramic body is not particularly limited, but the ceramic body may have a dimension depending on the use. For example, the ceramic body may have a dimension of $(0.6~5.6 \text{ mm}) \times (0.3~5.0 \text{ mm}) \times (0.3~1.9 \text{ mm})$.

A thickness of the dielectric layer 111 may be optionally changed according to capacitance design of the capacitor. According to an exemplary embodiment of the present disclosure, a thickness of a single dielectric layer after sintering may be preferably 0.2 µm or more.

Meanwhile, in the multilayer ceramic capacitor according to another exemplary embodiment of the present disclosure, the thickness of the dielectric layer 111 may be 0.7 µm or less.

According to another exemplary embodiment of the present disclosure, since the dielectric layer 111 contains the dielectric ceramic composition containing the dielectric grain having the core-shell structure, when a diameter of a core is defined as D1 and a diameter of the dielectric grain is defined as D2, the dielectric grain satisfying the following Expressions: 40 nm≤D1≤150 nm and 150 nm≤D2≤550 nm, even though the thickness is 0.7 or less, there is no short defect, and high capacitance may be obtained.

The first and second internal electrodes 121 and 122 may be stacked so that end surfaces thereof are alternately exposed to surfaces of both end portions of the ceramic body 110 opposing each other, respectively.

The first and second external electrodes 131 and 132 may be formed on both end portions of the ceramic body 110 and electrically connected to the exposed end surfaces of the first and second internal electrodes 121 and 122 that are alternately disposed, thereby configuring a capacitor circuit.

Although a conductive material contained in the first and second internal electrodes 121 and 122 is not particularly limited, since a material configuring the dielectric layer according to an exemplary embodiment of the present disclosure may have a form in which a paraelectric material and a ferroelectric material are mixed with each other or solid-solubilized, nickel (Ni) may be used.

A thickness of the first and second internal electrodes 121 and 122 may be appropriately determined depending on the use, or the like, but is not particularly limited. For example, the thickness may be 0.1 to 5 μm, or 0.1 to 2.5 μm.

A conductive material contained in the first and second external electrodes 131 and 132 is not particularly limited, but nickel (Ni), copper (Cu), or an alloy thereof may be used.

A thickness of the first and second external electrodes 131 and 132 may be appropriately determined depending on the use, or the like, but is not particularly limited. For example, the thickness may be 10 to 50 μm.

The dielectric layer 111 configuring the ceramic body 110 may contain the dielectric ceramic composition according to an exemplary embodiment of the present disclosure.

The dielectric ceramic composition may contain the base powder and accessory ingredients, wherein the base powder contains dielectric grains having a core-shell structure, and when the diameter of the core is defined as D1 and the diameter of the dielectric grain is defined as D2, D1 and D2 satisfy the following Expressions: 40 nm≤D1≤150 nm and 150 nm≤D2≤550 nm, respectively.

Since other features of the dielectric ceramic composition are the same as those of the above-mentioned dielectric ceramic composition according to an exemplary embodiment of the present disclosure, a detailed description thereof will be omitted.

Hereinafter, Inventive Examples and Comparative Examples of the present disclosure will be described in detail, but they are to help the specific understanding of the present disclosure. Therefore, the scope of the present disclosure is not limited to Inventive Examples.

After mixing raw material powder containing $BaTiO_3$ as a main ingredient with other ingredients at a composition ratio as shown in the following Table 1 together with a dispersant using ethanol and toluene as a solvent, a binder was mixed with the mixture, thereby forming a ceramic sheet.

As the raw material powder, $BaTiO_3$ powders having an average particle size of 25, 40, 80, and 150 nm were used.

Nickel (Ni) internal electrodes were printed on the formed sheets having a thickness of about 0.9 μm.

As upper and lower cover layers, 25 formed sheets having a thickness of 10 to 13 μm were stacked, and 21 sheets on which the internal electrode having a thickness of about 2.0 μm was printed were stacked as an active layer, thereby manufacturing a bar.

A compressed bar was cut into chips having a 3216 size (length×width×thickness: 3.2 mm×1.6 mm×1.6 mm) using a cutter.

After the cut chip was plasticized and sintered at 1100 to 1200° C. for 2 hours under reduction atmosphere (0.1% $H_2/99.9\% N_2$, $H_2O/H_2/N_2$), the sintered chip was heat-treated by performing re-oxidation at 1000° C. for 3 hours under nitrogen ($N_2$) atmosphere.

The sintered chip was subjected to a termination process using a copper (Cu) paste and an electrode sintering process, thereby completing external electrodes.

Capacitance, dissipation factors (DF), insulation resistance, temperature coefficients of capacitance (TCC), resistance degradation behaviors depending on a voltage step increase at a high temperature of 150° C., and the like, of Proto-type multilayer ceramic capacitor (MLCC) samples completed as described above were evaluated.

The room-temperature capacitance and a dielectric loss of the multilayer ceramic capacitor (MLCC) chip were measured at 1 kHz and AC voltage of 0.5 V/μm using a LCR-meter.

Permittivity of the multilayer ceramic capacitor (MLCC) chip was calculated from the capacitance, a thickness of a dielectric layer of the multilayer ceramic capacitor (MLCC) chip, an area of the internal electrode, the number of stacked dielectric layers.

Room temperature insulation resistance (IR) was measured after 60 seconds in a state in which ten samples each were taken and a DC voltage of 10 V/μm was applied thereto.

The temperature coefficient of capacitance (TCC) depending on a temperature was measured in a temperature range from −55 to 145° C.

In a high-temperature IR boosting test, the resistance degradation behavior was measured while increasing the voltage step by 5 V/μm at each step at 150° C., wherein the time of each step was 10 minutes and a resistance value was measured every 5 seconds.

The high-temperature breakdown voltage was derived from the high-temperature IR boosting test, wherein the high-temperature breakdown voltage means a voltage at which an IR may withstand $10^5 \Omega$ or more when the measurement was conducted while continuously increasing the voltage step after applying the voltage step of DC 5 V/μm to a 3216 size chip having 20 dielectric layers having a thickness 0.6 μm after sintering at 150° C. for 10 minutes.

A micro structure of the dielectric material was observed through scanning electron microscopy (SEM) and transmission electron microscopy (TEM) images.

When an average diameter of a core part measured by extracting at least ten dielectric grains from the base powder containing the core-shell structure shown in FIG. 1 was defined as D1, and an average diameter of the entire dielectric grain was defined D2, D1 and D2 were distinguished and calculated through scanning transmission electron microscopy (STEM)/energy dispersive spectroscopy (EDS).

The following Table 1 shows composition table of Experimental Examples (Inventive Examples and Comparative Examples), and Table 2 shows characteristics of proto-type multilayer ceramic capacitor (MLCC) chips corresponding to the compositions shown in Table 2.

TABLE 1

| | Content (mole) of Additive Based on 100 moles of Base Material (BaTiO$_3$) | | | | | | | | | | Micro Structure | |
|---|---|---|---|---|---|---|---|---|---|---|---|---|
| | 1st Accessory ingredient | 2nd Accessory ingredient | 3rd Accessory Ingredient | 4th Accessory ingredient | 5th Accessory ingredient | | 6th Accessory ingredient | | | | D1 | D2 |
| Sample | MnO2 | V2O5 | MgCO3 | Y2O3 | BaCO3 | Ca | Zr | Al2O3 | SiO2 | Ba/Si Ratio | (nm) | (nm) |
| *1 | 0.200 | 0.100 | 0.00 | 0.30 | 1.10 | 1.00 | 1.00 | 0.20 | 1.25 | 0.88 | 25.0 | 100.0 |
| *2 | 0.200 | 0.100 | 0.00 | 0.30 | 1.10 | 1.00 | 1.00 | 0.20 | 1.25 | 0.88 | 25.0 | 150.0 |
| *3 | 0.200 | 0.100 | 0.00 | 0.30 | 1.10 | 1.00 | 1.00 | 0.20 | 1.25 | 0.88 | 25.0 | 300.0 |
| *4 | 0.200 | 0.100 | 0.00 | 0.30 | 1.10 | 1.00 | 1.00 | 0.20 | 1.25 | 0.88 | 40.0 | 120.0 |
| 5 | 0.200 | 0.100 | 0.00 | 0.30 | 1.10 | 1.00 | 1.00 | 0.20 | 1.25 | 0.88 | 40.0 | 150.0 |
| 6 | 0.200 | 0.100 | 0.00 | 0.30 | 1.10 | 1.00 | 1.00 | 0.20 | 1.25 | 0.88 | 40.0 | 200.0 |
| 7 | 0.200 | 0.100 | 0.00 | 0.30 | 1.10 | 1.00 | 1.00 | 0.20 | 1.25 | 0.88 | 40.0 | 350.0 |
| *8 | 0.200 | 0.100 | 0.00 | 0.30 | 1.10 | 1.00 | 1.00 | 0.20 | 1.25 | 0.88 | 40.0 | 400.0 |
| *9 | 0.200 | 0.100 | 0.00 | 0.30 | 1.10 | 1.00 | 1.00 | 0.20 | 1.25 | 0.88 | 80.0 | 120.0 |
| 10 | 0.200 | 0.100 | 0.00 | 0.30 | 1.10 | 1.00 | 1.00 | 0.20 | 1.25 | 0.88 | 80.0 | 150.0 |
| 11 | 0.200 | 0.100 | 0.00 | 0.30 | 1.10 | 1.00 | 1.00 | 0.20 | 1.25 | 0.88 | 80.0 | 200.0 |
| 12 | 0.200 | 0.100 | 0.00 | 0.30 | 1.10 | 1.00 | 1.00 | 0.20 | 1.25 | 0.88 | 80.0 | 300.0 |
| 13 | 0.200 | 0.100 | 0.00 | 0.30 | 1.10 | 1.00 | 1.00 | 0.20 | 1.25 | 0.88 | 80.0 | 450.0 |
| *14 | 0.200 | 0.100 | 0.00 | 0.30 | 1.10 | 1.00 | 1.00 | 0.20 | 1.25 | 0.88 | 80.0 | 500.0 |
| *15 | 0.200 | 0.100 | 0.00 | 0.30 | 1.10 | 1.00 | 1.00 | 0.20 | 1.25 | 0.88 | 120.0 | 130.0 |
| 16 | 0.200 | 0.100 | 0.00 | 0.30 | 1.10 | 1.00 | 1.00 | 0.20 | 1.25 | 0.88 | 120.0 | 150.0 |
| 17 | 0.200 | 0.100 | 0.00 | 0.30 | 1.10 | 1.00 | 1.00 | 0.20 | 1.25 | 0.88 | 120.0 | 300.0 |
| 18 | 0.200 | 0.100 | 0.00 | 0.30 | 1.10 | 1.00 | 1.00 | 0.20 | 1.25 | 0.88 | 120.0 | 550.0 |
| *19 | 0.200 | 0.100 | 0.00 | 0.30 | 1.10 | 1.00 | 1.00 | 0.20 | 1.25 | 0.88 | 120.0 | 600.0 |
| *20 | 0.200 | 0.100 | 0.00 | 0.30 | 1.10 | 1.00 | 1.00 | 0.20 | 1.25 | 0.88 | 150.0 | 200.0 |
| *21 | 0.200 | 0.100 | 0.00 | 0.30 | 1.10 | 1.00 | 1.00 | 0.20 | 1.25 | 0.88 | 150.0 | 300.0 |
| *22 | 0.200 | 0.100 | 0.00 | 0.30 | 0.00 | 1.00 | 1.00 | 0.20 | 1.25 | 0.00 | 80.00 | 100.00 |
| *23 | 0.200 | 0.100 | 0.00 | 0.30 | 0.40 | 1.00 | 1.00 | 0.20 | 1.25 | 0.32 | 80.00 | 120.00 |
| 24 | 0.200 | 0.100 | 0.00 | 0.30 | 0.71 | 1.00 | 1.00 | 0.20 | 1.25 | 0.57 | 80.00 | 200.00 |
| 25 | 0.200 | 0.100 | 0.00 | 0.30 | 1.20 | 1.00 | 1.00 | 0.20 | 1.25 | 0.96 | 80.00 | 300.00 |
| 26 | 0.200 | 0.100 | 0.00 | 0.30 | 1.35 | 1.00 | 1.00 | 0.20 | 1.25 | 1.08 | 80.00 | 300.00 |
| 27 | 0.200 | 0.100 | 0.00 | 0.30 | 1.76 | 1.00 | 1.00 | 0.20 | 1.25 | 1.41 | 80.00 | 200.00 |
| 28 | 0.200 | 0.100 | 0.00 | 0.30 | 2.00 | 1.00 | 1.00 | 0.20 | 1.25 | 1.60 | 80.00 | 150.00 |
| *29 | 0.200 | 0.100 | 0.00 | 0.30 | 2.20 | 1.00 | 1.00 | 0.20 | 1.25 | 1.76 | 80.00 | 100.00 |
| 30 | 0.200 | 0.100 | 0.00 | 0.00 | 1.10 | 1.00 | 1.00 | 0.20 | 1.25 | 0.88 | 80.00 | 300.00 |
| 31 | 0.200 | 0.100 | 0.00 | 0.15 | 1.10 | 1.00 | 1.00 | 0.20 | 1.25 | 0.88 | 80.00 | 300.00 |
| 32 | 0.200 | 0.100 | 0.00 | 0.50 | 1.10 | 1.00 | 1.00 | 0.20 | 1.25 | 0.88 | 80.00 | 300.00 |
| 33 | 0.200 | 0.100 | 0.00 | 1.00 | 1.10 | 1.00 | 1.00 | 0.20 | 1.25 | 0.88 | 80.00 | 200.00 |
| 34 | 0.200 | 0.100 | 0.00 | 2.00 | 1.10 | 1.00 | 1.00 | 0.20 | 1.25 | 0.88 | 80.00 | 150.00 |
| *35 | 0.200 | 0.100 | 0.00 | 2.50 | 1.10 | 1.00 | 1.00 | 0.20 | 1.25 | 0.88 | 80.00 | 100.00 |
| *36 | 0.025 | 0.025 | 0.00 | 0.30 | 1.10 | 1.00 | 1.00 | 0.20 | 1.25 | 0.88 | 80.00 | 400.00 |
| 37 | 0.050 | 0.025 | 0.00 | 0.30 | 1.10 | 1.00 | 1.00 | 0.20 | 1.25 | 0.88 | 80.00 | 400.00 |
| *38 | 1.000 | 0.500 | 0.00 | 0.30 | 1.10 | 1.00 | 1.00 | 0.20 | 1.25 | 0.88 | 80.00 | 120.00 |
| 39 | 0.200 | 0.100 | 0.00 | 0.30 | 1.10 | 0.00 | 0.00 | 0.20 | 1.25 | 0.88 | 80.00 | 400.00 |
| 40 | 0.200 | 0.100 | 0.00 | 0.30 | 1.10 | 10.00 | 10.00 | 0.20 | 1.25 | 0.88 | 80.00 | 300.00 |
| *41 | 0.200 | 0.100 | 0.50 | 0.30 | 0.00 | 1.00 | 1.00 | 0.20 | 1.25 | 0.00 | 80.00 | 100.00 |
| *42 | 0.200 | 0.100 | 0.50 | 0.30 | 0.40 | 1.00 | 1.00 | 0.20 | 1.25 | 0.32 | 80.00 | 100.00 |
| 43 | 0.200 | 0.100 | 0.50 | 0.30 | 0.71 | 1.00 | 1.00 | 0.20 | 1.25 | 0.57 | 80.00 | 150.00 |
| 44 | 0.200 | 0.100 | 0.50 | 0.30 | 1.10 | 1.00 | 1.00 | 0.20 | 1.25 | 0.88 | 80.00 | 250.00 |
| 45 | 0.200 | 0.100 | 0.50 | 0.30 | 1.20 | 1.00 | 1.00 | 0.20 | 1.25 | 0.96 | 80.00 | 200.00 |
| 46 | 0.200 | 0.100 | 0.50 | 0.30 | 1.35 | 1.00 | 1.00 | 0.20 | 1.25 | 1.08 | 80.00 | 200.00 |
| 47 | 0.200 | 0.100 | 0.50 | 0.30 | 1.76 | 1.00 | 1.00 | 0.20 | 1.25 | 1.41 | 80.00 | 150.00 |
| 48 | 0.200 | 0.100 | 0.50 | 0.30 | 2.00 | 1.00 | 1.00 | 0.20 | 1.25 | 1.60 | 80.00 | 150.00 |
| *49 | 0.200 | 0.100 | 0.50 | 0.30 | 2.20 | 1.00 | 1.00 | 0.20 | 1.25 | 1.76 | 80.00 | 100.00 |
| 50 | 0.200 | 0.100 | 0.50 | 0.00 | 1.10 | 1.00 | 1.00 | 0.20 | 1.25 | 0.88 | 80.00 | 200.00 |
| 51 | 0.200 | 0.100 | 0.50 | 0.15 | 1.10 | 1.00 | 1.00 | 0.20 | 1.25 | 0.88 | 80.00 | 200.00 |
| 52 | 0.200 | 0.100 | 0.50 | 0.50 | 1.10 | 1.00 | 1.00 | 0.20 | 1.25 | 0.88 | 80.00 | 200.00 |
| 53 | 0.200 | 0.100 | 0.50 | 1.00 | 1.10 | 1.00 | 1.00 | 0.20 | 1.25 | 0.88 | 80.00 | 150.00 |
| 54 | 0.200 | 0.100 | 0.50 | 2.00 | 1.10 | 1.00 | 1.00 | 0.20 | 1.25 | 0.88 | 80.00 | 150.00 |
| *55 | 0.200 | 0.100 | 0.50 | 2.50 | 1.10 | 1.00 | 1.00 | 0.20 | 1.25 | 0.88 | 80.00 | 100.00 |
| *56 | 0.025 | 0.025 | 0.50 | 0.30 | 1.10 | 1.00 | 1.00 | 0.20 | 1.25 | 0.88 | 80.00 | 200.00 |
| 57 | 0.050 | 0.025 | 0.50 | 0.30 | 1.10 | 1.00 | 1.00 | 0.20 | 1.25 | 0.88 | 80.00 | 200.00 |
| *58 | 1.000 | 0.500 | 0.50 | 0.30 | 1.10 | 1.00 | 1.00 | 0.20 | 1.25 | 0.88 | 80.00 | 100.00 |
| 59 | 0.200 | 0.100 | 0.50 | 0.30 | 1.10 | 0.00 | 0.00 | 0.20 | 1.25 | 0.88 | 80.00 | 200.00 |
| 60 | 0.200 | 0.100 | 0.50 | 0.30 | 1.10 | 10.00 | 10.00 | 0.20 | 1.25 | 0.88 | 80.00 | 150.00 |
| *61 | 0.200 | 0.100 | 0.70 | 0.30 | 1.10 | 1.00 | 1.00 | 0.20 | 1.25 | 0.88 | 80.00 | 120.00 |
| 63 | 0.200 | 0.100 | 0.00 | 0.30 | 0.34 | 1.00 | 1.00 | 0.20 | 0.60 | 0.57 | 80.00 | 200.00 |
| 64 | 0.200 | 0.100 | 0.00 | 0.30 | 0.53 | 1.00 | 1.00 | 0.20 | 0.60 | 0.88 | 80.00 | 400.00 |
| 65 | 0.200 | 0.100 | 0.00 | 0.30 | 0.96 | 1.00 | 1.00 | 0.20 | 0.60 | 1.60 | 80.00 | 150.00 |
| *66 | 0.200 | 0.100 | 0.00 | 0.30 | 1.05 | 1.00 | 1.00 | 0.20 | 0.60 | 1.75 | 80.00 | 100.00 |
| *67 | 0.200 | 0.100 | 0.00 | 0.30 | 0.84 | 1.00 | 1.00 | 0.20 | 2.60 | 0.32 | 80.00 | 120.00 |
| 68 | 0.200 | 0.100 | 0.00 | 0.30 | 1.47 | 1.00 | 1.00 | 0.20 | 2.60 | 0.57 | 80.00 | 200.00 |
| 69 | 0.200 | 0.100 | 0.00 | 0.30 | 2.30 | 1.00 | 1.00 | 0.20 | 2.60 | 0.88 | 80.00 | 300.00 |

TABLE 1-continued

| | Content (mole) of Additive Based on 100 moles of Base Material (BaTiO₃) | | | | | | | | | | Micro Structure | |
|---|---|---|---|---|---|---|---|---|---|---|---|---|
| | 1st Accessory ingredient | 2nd Accessory ingredient | 3rd Accessory ingredient | 4th Accessory ingredient | 5th Accessory ingredient | | | 6th Accessory ingredient | | | D1 | D2 |
| Sample | MnO2 | V2O5 | MgCO3 | Y2O3 | BaCO3 | Ca | Zr | Al2O3 | SiO2 | Ba/Si Ratio | (nm) | (nm) |
| 70 | 0.200 | 0.100 | 0.00 | 0.30 | 4.15 | 1.00 | 1.00 | 0.20 | 2.60 | 1.60 | 80.00 | 150.00 |
| *71 | 0.200 | 0.100 | 0.00 | 0.30 | 4.58 | 1.00 | 1.00 | 0.20 | 2.60 | 1.76 | 80.00 | 100.00 |
| 72 | 0.200 | 0.100 | 0.00 | 0.30 | 3.17 | 1.00 | 1.00 | 0.20 | 3.60 | 0.88 | 80.00 | 200.00 |
| *73 | 0.200 | 0.100 | 0.00 | 0.30 | 4.05 | 1.00 | 1.00 | 0.20 | 4.60 | 0.88 | 80.00 | 120.00 |

*Comparative Example

TABLE 2

| | Characteristics | | | | | | Judgment of Characteristics | | | |
|---|---|---|---|---|---|---|---|---|---|---|
| Sample | Permittivity | DF(%) | RC(ΩF) | TCC(%) (85° C.) | High-Temperature Breakdown Voltage (V/μm)* | Short Occurrence Rate (%) | Permittivity/ DF ○: Good X: Poor Δ: Fair | TCC(85) ○: Good X: Poor Δ: Fair | High-Temperature Breakdown Voltage ○: Good X: Poor Δ: Fair | Short Occurrence Rate ○: Good X: Poor Δ: Fair |
| *1 | 2956 | 4.26 | 3325 | −17.2% | 50 | 0.0% | X | X | ○ | ○ |
| *2 | 3784 | 6.45 | 3457 | −19.4% | 70 | 0.0% | ○ | X | ○ | ○ |
| *3 | 5578 | 6.61 | 3287 | −20.6% | 60 | 0.0% | ○ | X | ○ | ○ |
| *4 | 3248 | 4.52 | 3025 | −10.2% | 65 | 0.0% | X | ○ | ○ | ○ |
| 5 | 3867 | 6.33 | 3124 | −13.1% | 70 | 0.0% | ○ | ○ | ○ | ○ |
| 6 | 4036 | 6.87 | 3068 | −13.6% | 70 | 0.0% | ○ | ○ | ○ | ○ |
| 7 | 5846 | 9.26 | 3176 | −14.5% | 60 | 0.0% | ○ | ○ | ○ | ○ |
| *8 | 6238 | 12.45 | 2754 | −15.8% | 55 | 0.0% | ○ | X | ○ | ○ |
| *9 | 3316 | 4.55 | 3368 | −8.6% | 70 | 0.0% | X | ○ | ○ | ○ |
| 10 | 3945 | 5.68 | 3269 | −9.1% | 70 | 0.0% | ○ | ○ | ○ | ○ |
| 11 | 4128 | 6.12 | 3164 | −9.8% | 70 | 0.0% | ○ | ○ | ○ | ○ |
| 12 | 6035 | 9.56 | 2846 | −10.5% | 70 | 0.0% | ○ | ○ | ○ | ○ |
| 13 | 6427 | 12.27 | 2740 | −12.4% | 60 | 0.0% | ○ | ○ | ○ | ○ |
| *14 | 7031 | 16.23 | 2532 | −15.7% | 55 | 5.0% | X | X | ○ | ○ |
| *15 | 3434 | 5.03 | 3256 | −7.8% | 70 | 2.3% | X | ○ | ○ | ○ |
| 16 | 4002 | 6.53 | 3184 | −8.3% | 70 | 2.5% | ○ | ○ | ○ | ○ |
| 17 | 6144 | 8.61 | 3168 | −9.8% | 65 | 3.4% | ○ | ○ | ○ | ○ |
| 18 | 7228 | 14.36 | 2547 | −13.6% | 55 | 3.6% | ○ | ○ | ○ | ○ |
| *19 | 8036 | 17.33 | 2456 | −16.5% | 50 | 12.0% | X | X | ○ | X |
| *20 | 4327 | 6.23 | 3367 | −9.5% | 60 | 10.5% | ○ | ○ | ○ | X |
| *21 | 6138 | 9.27 | 3258 | −10.1% | 60 | 12.4% | ○ | ○ | ○ | X |
| *22 | 2956 | 4.23 | 3420 | −9.4% | 60 | 0.0% | X | ○ | ○ | ○ |
| *23 | 3136 | 5.11 | 3256 | −9.7% | 65 | 0.0% | X | ○ | ○ | ○ |
| 24 | 4058 | 6.89 | 3258 | −10.5% | 65 | 0.0% | ○ | ○ | ○ | ○ |
| 25 | 5647 | 7.58 | 3145 | −10.7% | 60 | 0.0% | ○ | ○ | ○ | ○ |
| 26 | 5523 | 7.45 | 3027 | −10.9% | 60 | 0.0% | ○ | ○ | ○ | ○ |
| 27 | 4102 | 6.08 | 3268 | −10.1% | 65 | 0.0% | ○ | ○ | ○ | ○ |
| 28 | 3865 | 5.67 | 3336 | −9.7% | 65 | 0.0% | ○ | ○ | ○ | ○ |
| *29 | 2781 | 3.89 | 3415 | −9.2% | 70 | 0.0% | X | ○ | ○ | ○ |
| 30 | 5147 | 8.41 | 2789 | −9.2% | 50 | 0.0% | ○ | ○ | ○ | ○ |
| 31 | 5345 | 8.27 | 2856 | −10.5% | 60 | 0.0% | ○ | ○ | ○ | ○ |
| 32 | 6489 | 8.55 | 2936 | −10.8% | 70 | 0.0% | ○ | ○ | ○ | ○ |
| 33 | 4256 | 6.75 | 3001 | −7.6% | 60 | 0.0% | ○ | ○ | ○ | ○ |
| 34 | 3744 | 5.46 | 3455 | −8.1% | 50 | 0.0% | ○ | ○ | ○ | ○ |
| *35 | 2845 | 4.17 | 3455 | −8.1% | 40 | 0.0% | X | ○ | X | ○ |
| *36 | 6347 | 10.56 | 3287 | −13.5% | 40 | 0.0% | ○ | ○ | X | ○ |
| 37 | 6138 | 10.18 | 3287 | −13.5% | 50 | 0.0% | ○ | ○ | ○ | ○ |
| *38 | 3702 | 4.56 | 4896 | −7.1% | 70 | 0.0% | X | ○ | ○ | ○ |
| 39 | 6325 | 10.25 | 3216 | −13.4% | 65 | 0.0% | ○ | ○ | ○ | ○ |
| 40 | 5681 | 8.45 | 3687 | −11.5% | 60 | 0.0% | ○ | ○ | ○ | ○ |
| *41 | 2745 | 3.89 | 3658 | −7.8% | 65 | 0.0% | X | ○ | ○ | ○ |
| *42 | 2832 | 3.96 | 3625 | −7.9% | 65 | 0.0% | X | ○ | ○ | ○ |
| 43 | 3702 | 5.68 | 3456 | −8.2% | 65 | 0.0% | ○ | ○ | ○ | ○ |
| 44 | 5045 | 8.44 | 3125 | −10.5% | 65 | 0.0% | ○ | ○ | ○ | ○ |
| 45 | 3997 | 6.03 | 3546 | −8.4% | 60 | 0.0% | ○ | ○ | ○ | ○ |
| 46 | 4026 | 7.12 | 3580 | −8.1% | 60 | 0.0% | ○ | ○ | ○ | ○ |
| 47 | 3844 | 6.24 | 3484 | −7.5% | 65 | 0.0% | ○ | ○ | ○ | ○ |
| 48 | 3763 | 6.12 | 3562 | −7.6% | 65 | 0.0% | ○ | ○ | ○ | ○ |
| *49 | 2694 | 4.27 | 3451 | −7.5% | 65 | 0.0% | X | ○ | ○ | ○ |
| 50 | 4023 | 6.84 | 3312 | −8.4% | 50 | 0.0% | ○ | ○ | ○ | ○ |
| 51 | 4152 | 6.88 | 3256 | −8.5% | 60 | 0.0% | ○ | ○ | ○ | ○ |

TABLE 2-continued

| | Characteristics | | | | | Judgment of Characteristics | | | |
|---|---|---|---|---|---|---|---|---|---|
| | | | | | | Permittivity/ DF | TCC(85) | High-Temperature Breakdown Voltage | Short Occurrence Rate |
| | | | | | Short | ○: Good | ○: Good | ○: Good | ○: Good |
| | | | | High-Temperature | Occurrence | X: Poor | X: Poor | X: Poor | X: Poor |
| | Permit- | | | TCC(%) | Breakdown Voltage | Rate | Δ: Fair | Δ: Fair | Δ: Fair | Δ: Fair |
| Sample | tivity | DF(%) | RC(ΩF) | (85° C.) | (V/μm)* | (%) | | | | |
| 52 | 4108 | 6.54 | 3074 | −8.4% | 70 | 0.0% | ○ | ○ | ○ | ○ |
| 53 | 3879 | 6.52 | 3264 | −8.1% | 60 | 0.0% | ○ | ○ | ○ | ○ |
| 54 | 3748 | 6.45 | 3330 | −7.8% | 50 | 0.0% | ○ | ○ | ○ | ○ |
| *55 | 2784 | 4.75 | 3156 | −7.6% | 35 | 0.0% | X | ○ | X | ○ |
| *56 | 3978 | 7.45 | 3354 | −10.4% | 30 | 0.0% | ○ | ○ | X | ○ |
| 57 | 3845 | 7.26 | 3312 | −10.0% | 50 | 0.0% | ○ | ○ | ○ | ○ |
| *58 | 2745 | 3.88 | 4577 | −8.6% | 70 | 0.0% | X | ○ | ○ | ○ |
| 59 | 4011 | 7.71 | 3121 | −9.5% | 65 | 0.0% | ○ | ○ | ○ | ○ |
| 60 | 3745 | 7.26 | 3574 | −8.8% | 60 | 0.0% | ○ | ○ | ○ | ○ |
| *61 | 3455 | 5.77 | 3203 | −7.8% | 65 | 0.0% | X | ○ | ○ | ○ |
| 63 | 4123 | 6.94 | 3258 | −10.4% | 65 | 0.0% | ○ | ○ | ○ | ○ |
| 64 | 6547 | 12.33 | 2740 | −12.2% | 60 | 0.0% | ○ | ○ | ○ | ○ |
| 65 | 3945 | 5.84 | 3336 | −9.4% | 65 | 0.0% | ○ | ○ | ○ | ○ |
| *66 | 2888 | 3.92 | 3415 | −8.9% | 70 | 0.0% | X | ○ | ○ | ○ |
| *67 | 2988 | 5.10 | 3312 | −9.5% | 65 | 0.0% | X | ○ | ○ | ○ |
| 68 | 3845 | 6.71 | 3214 | −9.9% | 65 | 0.0% | ○ | ○ | ○ | ○ |
| 69 | 5212 | 9.88 | 3128 | −11.4% | 60 | 0.0% | ○ | ○ | ○ | ○ |
| 70 | 3844 | 5.76 | 3179 | −9.2% | 65 | 0.0% | ○ | ○ | ○ | ○ |
| *71 | 2732 | 3.84 | 3265 | −8.8% | 70 | 0.0% | X | ○ | ○ | ○ |
| 72 | 3955 | 5.55 | 3327 | −9.8% | 70 | 0.0% | ○ | ○ | ○ | ○ |
| *73 | 3124 | 4.64 | 3219 | −8.5% | 70 | 0.0% | X | ○ | ○ | ○ |

*Comparative Example

Experimental Examples 1 to 21 of Table 1 show experimental examples in which micro structures D1 and D2 were formed using a composition in which contents of first accessory ingredients ($MnO_2$ and $V_2O_5$) were 0.2 mol and 0.1 mol, respectively, a content of a second accessory ingredient ($MgCO_3$) was 0 mol, a content of a third accessory ingredient ($Y_2O_3$) was 0.3 mol, a content of a fourth accessory ingredient ($BaCO_3$) was 1.1 mol, a content of a fifth accessory ingredient (Ca, Zr) was 1.0 mol, and contents of sixth accessory ingredients ($Al_2O_3$ and $SiO_2$) were 0.2 mol and 1.25 mol, respectively, on the basis of 100 mol of $BaTiO_3$, and Experimental Examples 1 to 21 of Table 2 show characteristics of samples corresponding thereto.

In Experimental Examples 1 to 3 corresponding to the cases in which D1 was 25 nm, TCC (85° C.) was less than −15% regardless of a size of D2, such that the X5R temperature characteristics may not be satisfied.

In Experimental Examples 4 to 8, in the case in which D2 was 120 nm (Experimental Example 4) and the case in which permittivity was less than 3700 and D2 was 450 nm (Experimental Example 8), TCC (85° C.) was less than −15%, such that the X5R temperature characteristics may not be satisfied In the cases in which D2 was in a range from 150 to 350 nm, it may be confirmed that excellent characteristics (permittivity of 3700 or more, TCC (85° C.) less than −15%, high-temperature breakdown voltage of 50V/μm or more, and a short occurrence rate less than 10%) were obtained.

Experimental Examples 9 to 14 show the cases in which D2 was 80 nm and D2 was 120 to 500 nm. Among them, in the case in which D2 was small (120 nm), permittivity was less than 3700, and in the case in which D2 was excessively large (500 nm), TCC (85° C.) was less than −15%, and DF was 15% or more.

In Experimental Examples 10 to 13 corresponding to the cases in which D2 was 150 to 450 nm, it may be confirmed that excellent characteristics (permittivity of 3700 or more, TCC (85° C.) less than −15%, high-temperature breakdown voltage of 50V/μm or more, and a short occurrence rate less than 10%) were obtained.

Experimental Examples 15 to 19 show the cases in which D1 was 120 nm, and D2 was 130 to 600 nm. Among them, in the case (Experimental Example 15) in which D2 was small (130 nm), permittivity was less than 3700, and in the case (Experimental Example 19) in which D2 was excessively large (600 nm), TCC (85° C.) and DF were deteriorated, and the short occurrence rate was increased.

In Experimental Examples 16 to 18 corresponding to the cases in which D2 was 150 to 550 nm, it may be confirmed that excellent characteristics (permittivity of 3700 or more, TCC (85° C.) less than −15%, high-temperature breakdown voltage of 50V/on or more, and a short occurrence rate less than 10%) were obtained.

Experimental Examples 20 and 22 show the cases in which D1 was 150 nm and D2 was 200 to 300 nm. Here, it may be confirmed that the short occurrence rate was high (10% or more) regardless of the size of D2.

It may be confirmed from the above-mentioned results that when sizes of D1 and D2 were within the range shown in FIG. 2 in the compositions applied to Experimental Examples 1 to 21, in the dielectric layer having a thickness of 0.7 μm or less, excellent characteristics (permittivity of 3700 or more, TCC (85° C.) less than −15%, high-temperature breakdown voltage of 50V/μm or more, and the short occurrence rate less than 10%) may be obtained. Further, it may be confirmed that in the case of Experimental Example 13, significantly high permittivity of 6247 was obtained.

Experimental Examples 22 to 40 show compositions of experimental examples in which D1 was 80 nm and a content of the secondary accessory ingredient ($MgCO_3$) was 0 mol, on the basis of 100 mol of $BaTiO_2$, and Experimental Examples 22 to 40 show characteristics of the proto-type chips corresponding to these compositions.

In Experimental Examples 22 to 29, as a Ba/Si ratio, which is the content ratio between the fourth accessory ingredient (Ba) and the sixth accessory ingredient (Si), was increased in a state in which contents of other ingredients were fixed, permittivity was increased, such that in Experimental Example 23 in which the Ba/Si ratio was 0.88, D2 was significantly large (400 nm) and maximum permittivity of 6427 was measured, but when the Ba/Si ratio was further increased, D2 and permittivity tended to be decreased again.

In the case in which a Ba/Si ratio was 0.32 (Experimental Example 23) or 1.76 (Experimental Example 20), a size of D2 was 120 nm or less, and permittivity was decreased below 3700.

Therefore, when the Ba/Si ratio was in a range from 0.57 to 1.60, D2 was in a range from 150 to 400 nm, and high permittivity of 3700 or more was obtained.

In addition, the high-temperature breakdown voltage characteristics was excellent (60 v/µm or more) in this composition range.

Experimental Examples 30 to 35 of Table 1 show compositions in which a content of the third accessory ingredient ($Y_2O_3$) was changed under the condition at which a Ba/Si ratio was 0.88 and other ingredients except for the third accessory ingredient were the same, and Table 2 shows characteristics of proto-type chips corresponding to the cases of sintering application products to which these compositions were applied to form a micro structure as in Experimental Example 13.

As the content of Y was increased from 0 mol, permittivity was increased, and when the content of $Y_2O_3$ was 0.3 mol, the maximum permittivity of 6427 was obtained as in Experimental Example 13, and when the content of $Y_2O_3$ was further increased, D2 and permittivity were decreased again, such that permittivity was decreased to 2485 or so in the case in which when the content of $Y_2O_3$ was (Experimental Example 35).

In the case of the high-temperature breakdown voltage characteristics, when the content of $Y_2O_3$ was 0.15 to 1.0 mol, the high-temperature breakdown voltage was excellent (60 to 65V/µm or so) and when the content was less than or more than the above-mentioned range, a breakdown voltage level was also decreased again.

Therefore, the content of $Y_2O_3$ at which high permittivity was obtained and high-temperature breakdown voltage characteristics of 50V/µm or more was in a range from 0.0 to 2.0 mol.

Experimental Examples 36 to 38 of Table 1 show the cases in which a Ba/Si ratio was 0.88, and a content of the first accessory ingredient was low (Experimental Examples 36 and 7) and a content was excessively high (Experimental Example 38) under the condition at which other ingredients were the same, and Table 2 shows characteristics of the proto-type chips corresponding these compositions.

In the case of Experimental Example 36 in which the content of the first accessory ingredient was low, high temperature breakdown voltage characteristics was low (40V/µm), and in the case in which the content was excessively high as in Experimental Example 38, permittivity was decreased to 3702 or so.

Therefore, a total content of the first accessory ingredient at which high permittivity was obtained and high-temperature breakdown voltage characteristics were excellent may be 0.1 at % (corresponding to 0.05 mol of $MnO_2$ and 0.025 mol of $V_2O_5$) to 2.0 at % (corresponding to 1.0 mol of $MnO_2$ and 0.5 mol of $V_2O_5$) on the basis of $BaTiO_3$.

Experimental Examples 39 and 40 of Table 1 shows compositions corresponding to the cases in which a content of the fifth accessory ingredient was low ($CaCO_3$: 0 mol and $ZrO_2$: 0 mol) and high ($CaCO_3$: 10 mol and $ZrO_2$: 10 mol), respectively, under the condition at which the Ba/Si ratio was 0.88 and contents of other ingredients were the same, and Table 2 shows characteristics of the proto-type chip corresponding to these compositions.

In the case of Experimental Example 40 in which the content of the fifth accessory ingredient was excessive high, permittivity of 5680 or so was obtained. Therefore, the entire content of the fifth accessory ingredient at which high permittivity was obtained and high-temperature breakdown voltage characteristics were excellent may be 0.0 to 20.0 mol on the basis of $BiTiO_3$.

In addition, it may be confirmed that in all of the Experimental Examples of Table 1, since TCC at 85° C. was less than ±15% under the measurement condition at which a high AC electric field of AC 0.5V/µm was applied, the X5R standard was satisfied.

Experimental Examples 41 to 60 show compositions of experimental examples in which D1 was 80 nm and a content of the secondary accessory ingredient ($MgCO_3$) was 0.5 mol on the basis of 100 mole of $BaTiO_2$, and Table 2 shows characteristics of the proto-type chips corresponding to these compositions.

The size of D2 tended to be entirely decreased as compared to the case in which the content of the secondary accessory ingredient ($MgCO_3$) was 0, but a content range of each ingredients at which excellent characteristics (permittivity of 3700 or more, high-temperature breakdown voltage of 50V/µm or more, a short occurrence rate less than 10%, and TCC (85° C.) less than −15%) were obtained was the same as that in the case in which the content of $MgCO_3$ was 0.

Experimental Example 1 of Table 1 shows a composition in the casein which D1 was 80 nm, the content of the secondary accessory ingredient ($MgCO_3$) was 0.7 mol on the basis of 100 mole of $BaTiO_2$.

D2 was significantly decreased to 120 nm as compared to the cases in which the content of $MgCO_3$ was 0.1 mol (Experimental Example 130 and 0.5 mol (Experimental Example 44), such that permittivity was less than 3700.

Therefore, it may be confirmed that in order to allow the size of D2 to be 150 nm or more and obtain permittivity of 3700 or more, the content of Mg needs to be 0.5 mol or less.

Experimental Examples 62 to 66 and 67 to 71 in Table 1 show Inventive Examples in which when the content of the second accessory ingredient ($MgCO_3$) was 0, and the content of the sixth accessory ingredient ($SiO_2$) was 0.6 mol and 2.6 mol, respectively, the Ba/Si ratio was changed, and Table 2 shows characteristics of the proto-type chips corresponding to these compositions.

Even in the case in which the content of $SiO_2$ was 0.6 mol and 2.6 mol, when the Ba/Si ratio was in a range from 0.57 to 1.0, high permittivity of 3700 or more was obtained, as in the case in which the content of $SiO_2$ was 1.25 mol.

Further, when the Ba/Si ratio was maintained at 0.88, even though the content of $SiO_2$ was increased to 3.6 mol (Experimental Example 72), permittivity of 3700 or more was maintained.

In the case in which the content of $SiO_2$ was excessively high (4.6 mol, Experimental Example 73), even though the Ba/Si ratio was maintained at 0.88, permittivity was decreased below 3700 again.

Therefore, the maximum content of $SiO_2$ may be 3.6 mol %.

As set forth above, according to exemplary embodiments of the present disclosure, the dielectric ceramic composition capable of obtaining high permittivity and excellent high-temperature withstand voltage characteristics and having no short defect, and the multilayer ceramic capacitor comprising the same may be provided.

While exemplary embodiments have been shown and described above, it will be apparent to those skilled in the art that modifications and variations could be made without departing from the scope of the present invention as defined by the appended claims.

What is claimed is:

1. A dielectric ceramic composition comprising: a base powder; and an accessory ingredient, wherein the base powder includes dielectric grains having a core-shell structure, and when a diameter of a core is defined as D1 and a diameter of the dielectric grain is defined as D2, 40 nm≤D1≤150 nm and 150 nm≤D2≤550 nm are satisfied.

2. The dielectric ceramic composition of claim 1, wherein the base powder contains at least one selected from the group consisting of $BaTiO_3$, $(Ba_{1-x}Ca_x)(Ti_{1-y}Ca_y)O_3$ (0≤x≤0.3, 0≤y≤0.1), $(Ba_{1-x}Ca_x)(Ti_{1-y}Zr_y)O_3$ (0≤x≤0.3, 0≤y≤0.5), and $Ba(Ti_{1-y}Zr_y)O_3$ (0<y≤0.5).

3. The dielectric ceramic composition of claim 1, wherein the accessory ingredient contains 0.1 to 2.0 mol % of a first accessory ingredient which is an oxide or carbonate containing at least one of Mn, V, Cr, Fe, Ni, Co, Cu, and Zn, on the basis of 100 mol % of the base powder.

4. The dielectric ceramic composition of claim 1, wherein the accessory ingredient contains 0.0 to 0.5 mol % of a second accessory ingredient which is an oxide or carbonate containing a fixed valence acceptor element (Mg), on the basis of 100 mol % of the base powder.

5. The dielectric ceramic composition of claim 1, wherein the accessory ingredient contains 0.0 to 4.0 mol % of a third accessory ingredient which is an oxide or carbonate containing at least one of Y, Dy, Ho, Er, Gd, Ce, Nd, Pm, Eu, Tb, Tm, Yb, Lu, and Sm, on the basis of 100 mol % of the base powder.

6. The dielectric ceramic composition of claim 1, wherein the accessory ingredient contains 0.0 to 4.15 mol % of a fourth accessory ingredient which is an oxide or carbonate containing Ba, on the basis of 100 mol % of the base powder.

7. The dielectric ceramic composition of claim 1, wherein the accessory ingredient contains 0.0 to 20.0 mol % of a fifth accessory ingredient which is an oxide or carbonate containing at least one of Ca and Zr, on the basis of 100 mol % of the base powder.

8. The dielectric ceramic composition of claim 1, wherein the accessory ingredient contains 0.0 to 4.0 mol % of a sixth accessory ingredient which is an oxide containing at least one of Si and Al or a glass compound containing Si, on the basis of 100 mol % of the base powder.

9. The dielectric ceramic composition of claim 1, wherein the accessory ingredient contains a fourth accessory ingredient which is an oxide or carbonate containing Ba and a sixth accessory ingredient which is at least one of an oxide containing at least one of Si and Al or a glass compound containing Si, and
a content ratio of the fourth accessory ingredient to the sixth accessory ingredient satisfies 0.57≤Ba/Si≤1.6.

10. A multilayer ceramic capacitor comprising:
a ceramic body in which dielectric layers and first and second internal electrodes are alternately stacked; and
first and second external electrodes provided on both end portions of the ceramic body and electrically connected to the first and second internal electrodes,
wherein the dielectric layers contain a dielectric ceramic composition containing base powder and an accessory ingredient,
the base powder including dielectric grains having a core-shell structure, and
when a diameter of a core is defined as D1 and a diameter of the dielectric grain is defined as D2, 40 nm≤D1≤150 nm and 150 nm≤D2≤550 nm are satisfied.

11. The multilayer ceramic capacitor of claim 10, wherein the base powder contains at least one selected from the group consisting of $BaTiO_3$, $(Ba_{1-x}Ca_x)(Ti_{1-y}Ca_y)O_3$ (0≤x≤0.3, 0≤y≤0.1), $(Ba_{1-x}Ca_x)(Ti_{1-y}Zr_y)O_3$ (0≤x≤0.3, 0≤y≤0.5), and $Ba(Ti_{1-y}Zr_y)O_3$ (0<y≤0.5).

12. The multilayer ceramic capacitor of claim 10, wherein the dielectric ceramic composition contains 0.1 to 2.0 mol % of a first accessory ingredient which is an oxide or carbonate containing at least one of Mn, V, Cr, Fe, Ni, Co, Cu, and Zn, on the basis of 100 mol % of the base powder.

13. The multilayer ceramic capacitor of claim 10, wherein the dielectric ceramic composition contains 0.0 to 0.5 mol % of a second accessory ingredient which is an oxide or carbonate containing a fixed valence acceptor element (Mg), on the basis of 100 mol % of the base powder.

14. The multilayer ceramic capacitor of claim 10, wherein the dielectric ceramic composition contains 0.0 to 4.0 mol % of a third accessory ingredient which is an oxide or carbonate containing at least one of Y, Dy, Ho, Er, Gd, Ce, Nd, Pm, Eu, Tb, Tm, Yb, Lu, and Sm, on the basis of 100 mol % of the base powder.

15. The multilayer ceramic capacitor of claim 10, wherein the dielectric ceramic composition contains 0.0 to 4.15 mol % of a fourth accessory ingredient which is an oxide or carbonate containing Ba, on the basis of 100 mol % of the base powder.

16. The multilayer ceramic capacitor of claim 10, wherein the dielectric ceramic composition contains 0.0 to 20.0 mol % of a fifth accessory ingredient which is an oxide or carbonate containing at least one of Ca and Zr, on the basis of 100 mol % of the base powder.

17. The multilayer ceramic capacitor of claim 10, wherein the dielectric ceramic composition contains 0.0 to 4.0 mol % of a sixth accessory ingredient which is an oxide containing at least one of Si and Al or a glass compound containing Si, on the basis of 100 mol % of the base powder.

18. The multilayer ceramic capacitor of claim 10, wherein the dielectric ceramic composition contains a fourth accessory ingredient which is an oxide or carbonate containing Ba and a sixth accessory ingredient which is an oxide containing at least one of Si and Al or a glass compound containing Si, and
a content ratio of the fourth accessory ingredient to the sixth accessory ingredient satisfies 0.57≤Ba/Si≤1.6.

* * * * *